UNITED STATES PATENT OFFICE.

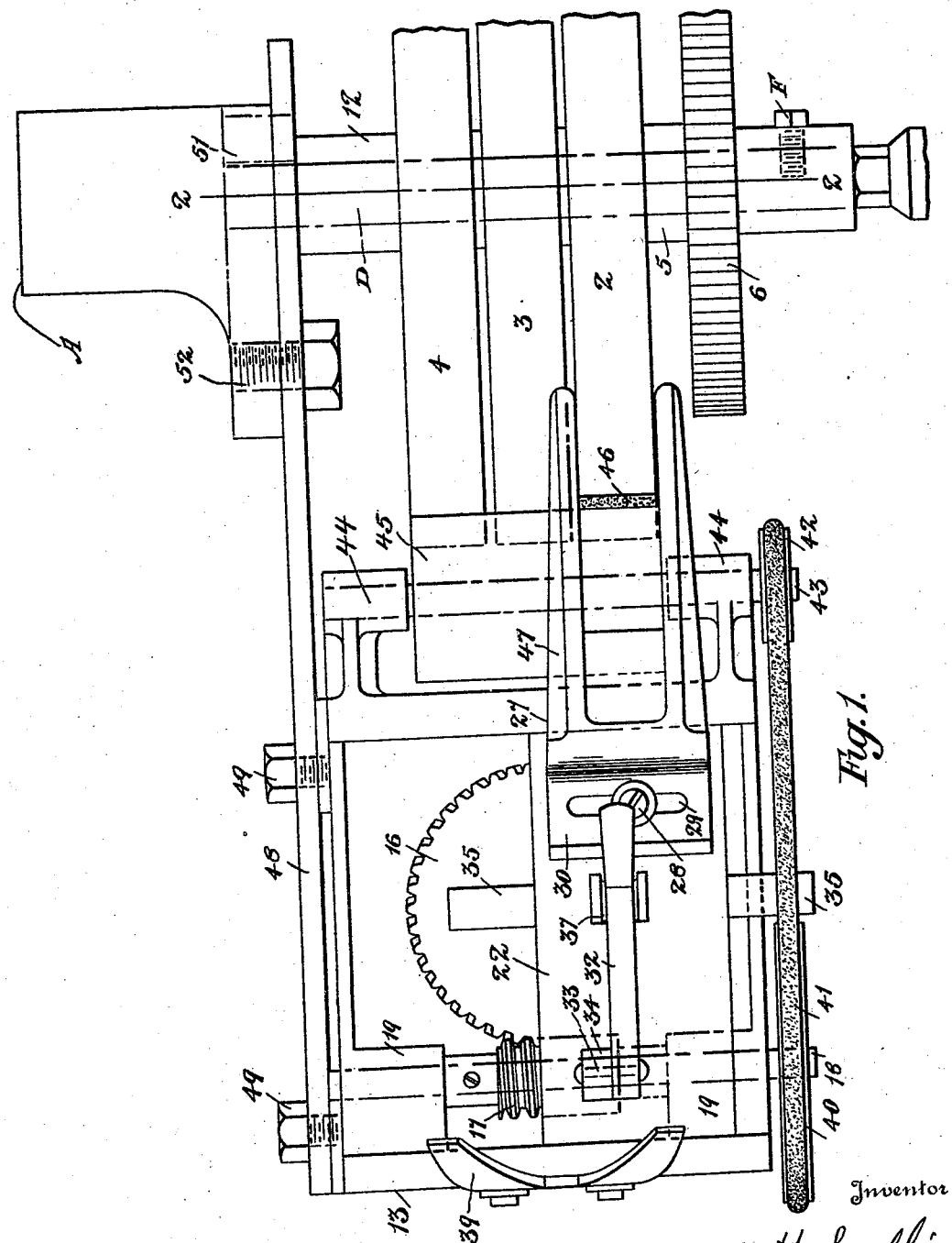

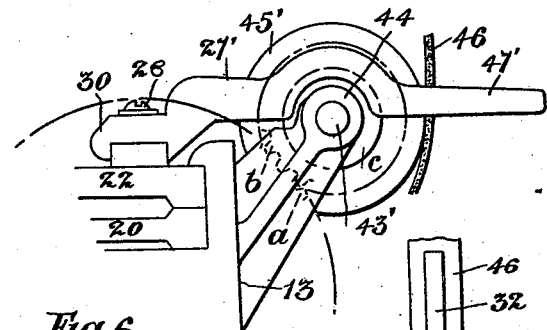
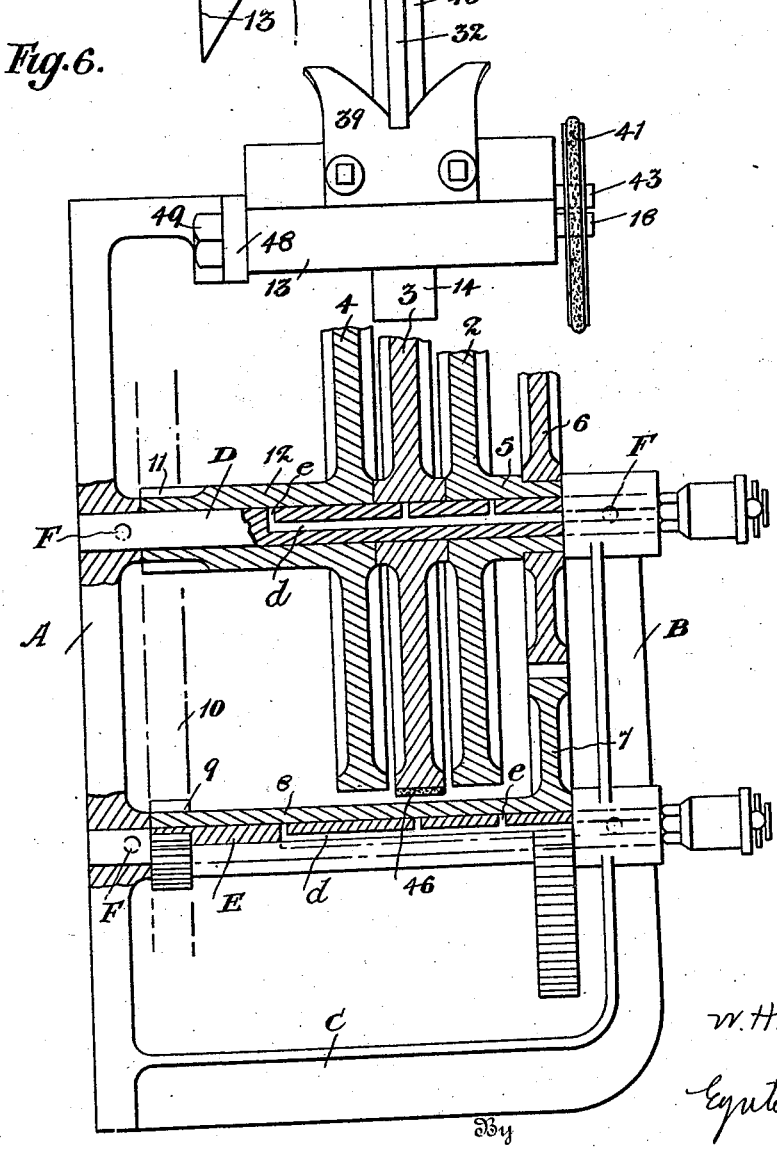

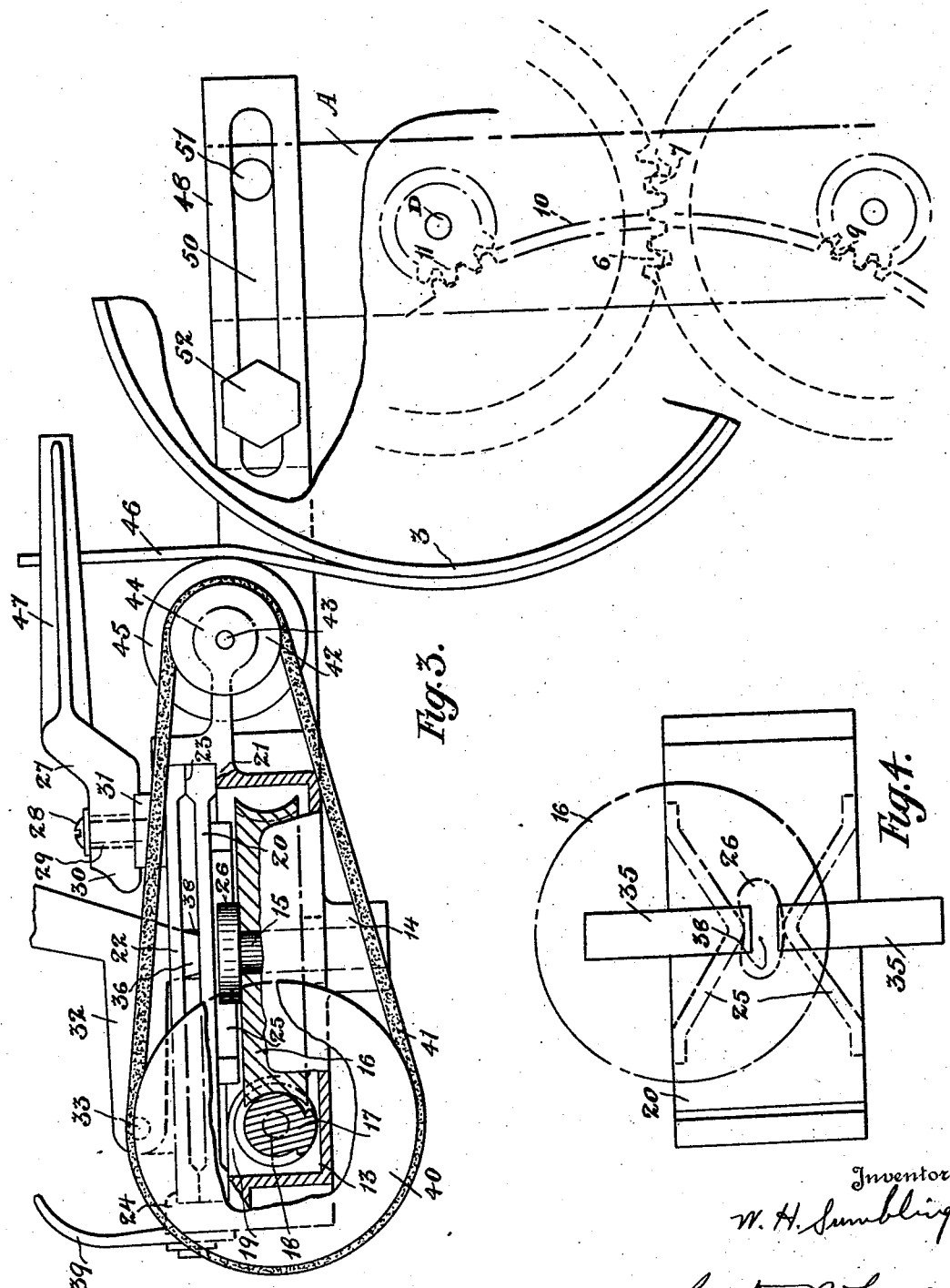

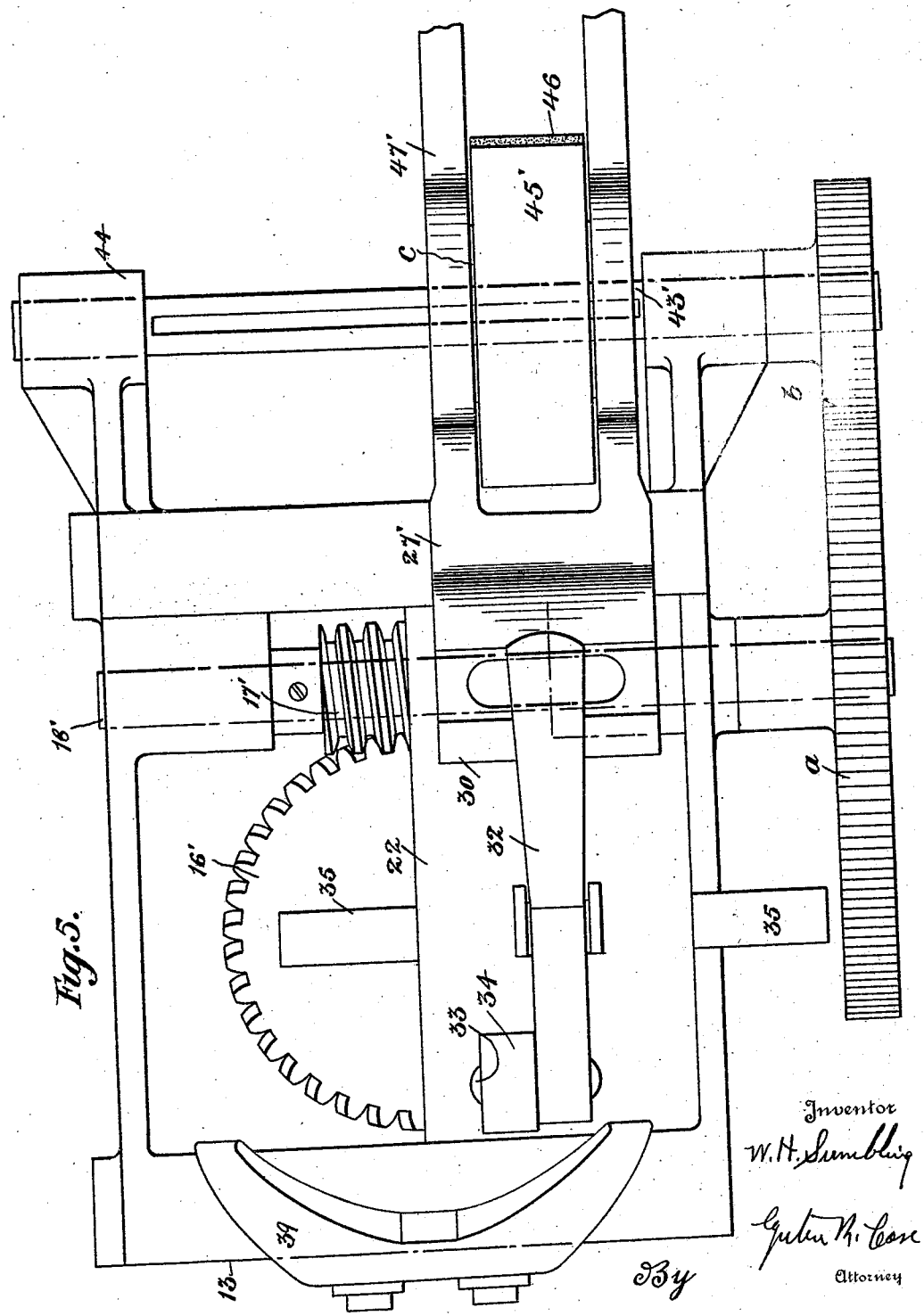

WILLIAM HENRY SUMBLING, OF TORONTO, ONTARIO, CANADA, ASSIGNOR TO SUMBLING MACHINERY COMPANY, LIMITED, OF TORONTO, ONTARIO, CANADA.

COMBINED REVERSING GEAR AND BELT SHIFTER AND TIGHTENER MECHANISM FOR POWER-DRIVEN MACHINES.

1,417,699.

Specification of Letters Patent.  Patented May 30, 1922.

Application filed July 19, 1920. Serial No. 397,212.

*To all whom it may concern:*

Be it known that I, WILLIAM HENRY SUMBLING, of the city of Toronto, county of York, Province of Ontario, Canada, a subject of the King of Great Britain, have invented certain new and useful Improvements in Combined Reversing Gear and Belt Shifter and Tightener Mechanism for Power-Driven Machines, of which the following is a specification.

My invention has considerable bearing upon the reversing gear patented to me on March 12, 1918 No. 1,259,056, and one of the objects of the invention is to simplify considerably the reversing gear disclosed in the said patent so that I may be able to put on the market a washing machine at a lower price than those I now manufacture embodying the reversing gear before identified, and at the same time overcome the disadvantage of certain rotating elements moving in opposite directions with their bearing surfaces in contact. Another object of my invention is to improve the construction of the belt-shifting mechanism so that the same may be driven by frictional contact with the single belt used to drive the reversing gear, and which belt-shifting mechanism may be used as a belt tightener. A still further object of the invention is to design a reversing gear driven by one belt only, to reduce the overhang of the driving and reversing gear beyond one end of the casing enclosing the cylinder, since the mechanism is usually carried by one end of said casing. Reducing said overhang prevents any sagging in the supporting end of the said casing. Further objects of my invention will appear from time to time in the following specification wherein I shall describe the preferred construction of the various parts, and certain modifications thereof, and what I claim as new will be pointed out in the claims forming part of this specification.

Figure 1 is a plan elevation of my combined reversing gear and belt-shifter-and-tightener mechanism, certain parts being broken away. Figure 2 is, in part a vertical cross-section on the line 2—2, Figure 1. Figure 3 is a side elevation of the mechanism shown in Figure 1, certain parts being broken away and shown in section for clearness of illustration. Figure 4 is a plan elevation of certain parts of the belt-shifting mechanism. Figure 5 is a plan elevation of a modified form of the belt-shifting mechanism, and Figure 6 is a side elevation of the drive-pulley, and its supporting parts, illustrated in Figure 5.

In the drawings, like characters of reference refer to the same parts.

With my improved reversing-gear as well as in the reversing gear before identified, it is only necessary to use one drive-belt, thereby dispensing with the twisted belt now necessarily used in this class of apparatus. It is well known that the use of two belts in laundry machines necessitates rather skilled attention on the part of the operator, particularly because of the fact that no two belts stretch alike.

I have found it necessary to provide a very simple belt-tightener for use with the washing machines I manufacture, and I effect this function by adjustably mounting the belt-shifting mechanism on a suitable support, and provide the belt-shifting mechanism with a pulley which tracks against the single drive-belt. The frictional contact of said pulley with said belt operates suitable means to put into motion the mechanism to shift the belt at the required time, while at the same time the said pulley performs the function of a tightener for the belt.

The reversing-gear comprises a suitable frame which also preferably supports the belt-shifting mechanism, and the said frame is adapted to be attached to the casing. Mounted in said frame are a pair of bars held against rotation, and mounted to freely rotate on one of these bars are three pulleys substantially of the same diameter, with which co-operates the drive-belt before mentioned. Mounted on the hub of one of said pulleys in such a manner as to rotate therewith is a gear-wheel which meshes with a gear-wheel rotatably mounted on the other of said bars. The last mentioned gear-wheel is provided with a pinion which co-acts with another pinion carried by the hub of one of said pulleys in order to drive the cylinder in opposite directions, as hereinafter more particularly set forth.

Obviously I may use my improved belt-shifter with the reversing-gear described in my said patent, and therefore I do not confine myself to the use of the said belt-shifter with the reversing-gear I shall now describe.

The frame supporting the reversing-gear comprises two uprights A and B which are preferably coupled together by the arm C. This frame is of course adapted to be coupled to the casing (not shown). Suitably fixed in the uprights A and B are bars D and E. These bars are held against rotation by any suitable means, such as the set-screws F which are held in the uprights before mentioned. 2, 3, and 4, are pulleys, substantially of the same diameter, mounted to rotate on the bar D. Secured to, or formed a part of the hub 5 of the pulley 2 is a gear-wheel 6 which is constantly in mesh with a gear-wheel 7, mounted to freely rotate on the bar E. The gear-wheel 7 is provided with a hub 8, and the same carries a pinion 9 secured thereto or formed a part thereof, which pinion is constantly in mesh with the gearing 10 represented by the two vertical dotted lines, and this gearing is secured to the cylinder (not shown). 11 is a pinion secured to or formed a part of the hub 12 of the pulley 4, and this pinion 11 is constantly in mesh with the gearing 10. Obviously the pinions 9 and 11 will transmit motion to the gearing 10 alternately, and through the parts before mentioned, the said gearing 10 is moved in opposite directions. The belt-shifting mechanism comprises a box 13 the bottom of which is provided with a step-bearing 14 in which is mounted the stud 15 which supports the worm-wheel 16 within said box. 17 is a worm-gear constantly in mesh with the wheel 16, and this worm-gear is mounted on and suitably coupled to a shaft 18 which has bearing in the bosses 19 of the box 13. 20 is a plate having movement upon flanges 21 of the box 13, and 22 is a plate positioned above the plate 20. These plates have sliding contact at their ends as shown at 23. 24 are retaining flanges forming part of the box 13 and underneath which operates the plate 22.

Secured to or formed a part of the plate 20 and depending below the underside thereof are a pair of rib-cams 25 of a well-known shape, and operating between these rib-cams is a cam 26 secured to or formed a part of the worm-wheel 16.

27 is a fork adjustably carried by the plate 22 by any suitable means. For instance the washer-provided screw 28 may be used to extend through the slot 29 formed in the base 30 of said fork, and screw into the bar or boss 31 carried by said plate 22.

32 is any suitable arm pivoted as at 33 to the lug 34 carried by the plate 22.

35 are a pair of bars secured to or formed a part of the plate 20. 36 is a spur forming part of the arm 32, and this spur normally extends through an opening 37 formed in the plate 20, and into the space 38 separating the inner ends of the bars 35. While in the position shown in Figures 1 and 3 the arm 32 is coupling the plates 20 and 22 together so that through the co-action between the worm-gear before described the fork 27 may be moved to shift the belt. 39 is a forked-rest of any suitable shape, suitably carried by the box 13, and this rest receives the arm 32 when it is desired to uncouple the plates 20 and 22.

In Figures 1, 2, and 3, I show a pulley 40 coupled to the shaft 18 and co-acting with this pulley is a belt 41 which passes around a pulley 42 keyed to the shaft 43 which is journalled in the bosses 44 forming part of the box 13, or suitably secured thereto. Suitably coupled to the shaft 43 is a pulley 45 the length of which is substantially equal to the combined width of the pulleys 2, 3, and 4. 46 is the drive-belt and the same of course operates between prongs 47 of the fork 27. This belt is substantially of the same width as the individual pulleys 2, 3, and 4. In Figure 3 it will be seen clearly that the pulley 45 has frictional contact with the belt 46, and therefore through the pulleys 40 and 42 and belt 41 the belt-shifting mechanism already described derives motion so that the belt 46 may be shifted alternately onto and from the pulleys 2 and 4 and so reverse the direction of rotation of the cylinder (not shown).

It will of course be understood that the plate 20 keeps reciprocating so long as the worm 17 is in action. When the arm 32 is resting in the rest 39, the fork 27 will be holding the belt 46 on the idler-pulley 3, and consequently the reversing-gear will be brought to rest.

To start the fork 27 into action, the arm 32 will be thrown out of the rest 39 and its spur 36 will come in contact with either of the bars 35, and so soon as the space 38 passes underneath the spur 36, the weight of the arm 32 will cause said spur to pass into said space and so ultimately motion from the plate 20 will be transmitted to the plate 22.

The box 13 is adjustably carried by the upright A after any suitable manner. Suitable means for this purpose comprises a plate 48 to which said box is coupled by any suitable means such as screws 49 tapped into a side of said box. This plate 48 is provided with a longitudinal slot 50 through which extends a stud 51 fixed in the upright A. 52 is a screw tapped into the upright A and extending through the slot 50. Through the medium of the screw 52 it will be readily seen that the belt-shifter may be shifted so as to tighten the belt.

In Figures 5 and 6 I show a modified form of belt-shifting mechanism. The shaft 18' is provided with a worm-gear 17' which meshes with the worm-wheel 16'. In place of the belt-drive disclosed in Figure 3 I show a gear-drive. Keyed to the shaft 18' is a gear-wheel $a$ which is in mesh with a pinion $b$ keyed to the shaft 43'. 45' is a pulley splined on the shaft 43', and this pulley is mounted to operate between the prongs 47' of the fork 27'. The prongs of this fork are shaped to avoid contact with the shaft 43', and to contact with the hub $c$ of the pulley 45'. In this form of combined belt-shifter and tightener, the pulley 45' is of course also in frictional contact with the belt 46, and as the said belt is shifted by the fork 27' so the said pulley will be moved longitudinally on the shaft 43', as will be clearly understood.

The pulleys 2, 3, and 4 and the gear-wheel 7 may be lubricated in various ways, such as by means of passage-ways $d$ formed in the bars D and E, which passage-ways are provided with outlets $e$ through which a lubricant passes.

While I have stated I use my invention particularly in connection with washing machines, it must be understood that I do not confine myself to using my invention with any particular type of suitable power-driven machines.

Various changes in construction in many parts of the mechanism herein described will suggest themselves to one skilled in the art, without going outside the scope of my invention as described and claimed.

What I claim is:

1. A reversing-gear comprising the combination of two bars; a suitable frame in which said bars are held against rotation; three pulleys mounted to freely rotate on one of said bars, the central pulley being essentially an idler; a gear-wheel associated with one of the outside pulleys to rotate therewith, and constantly in mesh with a gear-wheel mounted to freely rotate on the other of said bars; a pinion associated with said second-mentioned gear-wheel to be rotated thereby, and a pinion associated with the other outside pulley and designed to be rotated thereby, the said pinions adapted to mesh with a toothed rack for the purpose specified.

2. A reversing-gear comprising the combination of two bars; a suitable frame in which said bars are held against rotation comprising two uprights coupled together by a lower arm; three pulleys mounted to freely rotate on one of said bars and between said uprights, the central pulley being essentially an idler; a gear-wheel associated with one of the outside pulleys to rotate therewith, and constantly in mesh with a gear-wheel mounted to freely rotate on the other of said bars; a pinion associated with said second-mentioned gear-wheel to be rotated thereby, and a pinion associated with the other outside pulley and designed to be rotated thereby, the said pinions adapted to mesh with a toothed rack for the purpose specified.

3. The combination with a reversing-gear comprising a suitable frame; three pulleys mounted to have independent rotation in said frame, and comprising a central pulley and two outside pulleys; a gear-wheel associated with one of said outside pulleys to rotate therewith; a pinion associated with the other of said outside pulleys to be rotated therewith; a second gear-wheel journalled in said frame and in mesh with said first-mentioned gear-wheel, and a pinion associated with said second-mentioned gear-wheel; the said pinions designed to mesh with a toothed rack, of a belt-shifting mechanism comprising a suitable support adjustably carried by said frame, a first and a second plate mounted to reciprocate in said support; a shaft journalled in said support; means mounted within said support and co-acting with said second plate and operated by said shaft to reciprocate said plate; means carried by the said first plate whereby it is coupled to, and uncoupled from, the second plate; a pulley journalled in said support; a drive-belt associated with said first-mentioned pulleys and with which said fourth-mentioned pulley has frictional contact; means whereby movement is transmitted from said fourth-mentioned pulley to said shaft, and means carried by one of said reciprocating plates to bring pressure laterally against said belt, for the purpose specified.

4. The combination with a reversing-gear comprising a suitable frame; three pulleys mounted to have independent rotation in said frame, and comprising a central pulley and two outside pulleys; a gear-wheel associated with one of said outside pulleys to rotate therewith; a pinion associated with the other of said outside pulleys to be rotated therewith; a second gear-wheel journalled in said frame and in mesh with said first-mentioned gear-wheel, and a pinion associated with said second-mentioned gear-wheel; the said pinions designed to mesh with a toothed rack, of a belt-shifting mechanism comprising a suitable support adjustably carried by said frame; a first and a second plate mounted to reciprocate in said support; a shaft journalled in said support; means mounted within said support and co-acting with said second plate and operated by said shaft to reciprocate said plate; means carried by the said first plate whereby it is coupled to, and uncoupled from, said second plate; a second shaft journalled in said support; a pulley mounted on said second shaft and adapted to rotate the same; a drive-belt co-operating with said first-mentioned pulleys and with which said fourth-mentioned pulley has frictional contact; means whereby movement is transmitted from said second-mentioned shaft to said first-mentioned shaft, and means carried by one of said reciprocating plates to bring pressure laterally against said belt, for the purpose specified.

5. A combined belt-shifter and tightener comprising a suitable support; first and second plates mounted to reciprocate in said support, a shaft journalled in said support; means mounted within said support and dominated by said shaft and co-acting with said second plate to reciprocate the same; means carried by said first plate whereby it may be coupled to, and uncoupled from, said second plate; a pulley journalled in said frame and designed to have frictional contact with a drive-belt; means whereby movement is transmitted from said pulley to said shaft, and means carried by one of said plates and adapted to bring pressure laterally against said belt, for the purpose specified.

6. A combined belt-shifter and tightener comprising a suitable adjustable support; first and second plates mounted to reciprocate in said support, a first shaft journalled in said support; means mounted within said support and dominated by said shaft and co-acting with said second plate to reciprocate the same; means carried by said first plate whereby it may be coupled to, and uncoupled from, said second plate; a second shaft journalled in said support; a pulley mounted on said second-mentioned shaft to rotate the same and designed to have frictional contact with a drive-belt; means whereby energy is transmitted from said second-mentioned shaft to said first-mentioned shaft, and means carried by one of said plates and adapted to bear laterally against said belt, for the purpose specified.

7. The combination with three pulleys comprising a middle and two outer pulleys mounted to rotate on a suitable support; a toothed member, and means intermediate said pulleys and said toothed member whereby through the co-action of a drive-belt co-acting with said outside pulleys the direction of rotation of said toothed member will be alternately reversed, of means for shifting said belt over said pulleys to reverse the direction of movement of said toothed member comprising a suitable support adjustably mounted; a pulley journalled in said support and adapted to have frictional contact with said belt, means carried by said support and adapted to bring pressure to bear laterally against said belt, and means associated with said support and deriving energy from said fourth-mentioned pulley whereby said means exerting lateral pressure against said belt is caused to function, for the purpose specified.

8. In combination, three pulleys mounted to rotate on a common support, the central pulley being essentially an idler; a toothed member; means intermediate certain of said pulleys and said toothed member whereby through the co-action of a drive-belt with said pulleys the direction of rotation of said toothed member will be alternately reversed, and means held in contact with said drive-belt and adapted to be put into motion by said belt in order that lateral pressure may be exerted thereby against said belt to shift its position in respect of said pulleys, for the purpose set forth.

WILLIAM HENRY SUMBLING.